June 15, 1926.
H. H. HINDSHAW
1,588,420
PROCESS FOR UTILIZING LOW GRADE IRON ORE MATERIAL
Filed Dec. 12, 1924   2 Sheets-Sheet 1
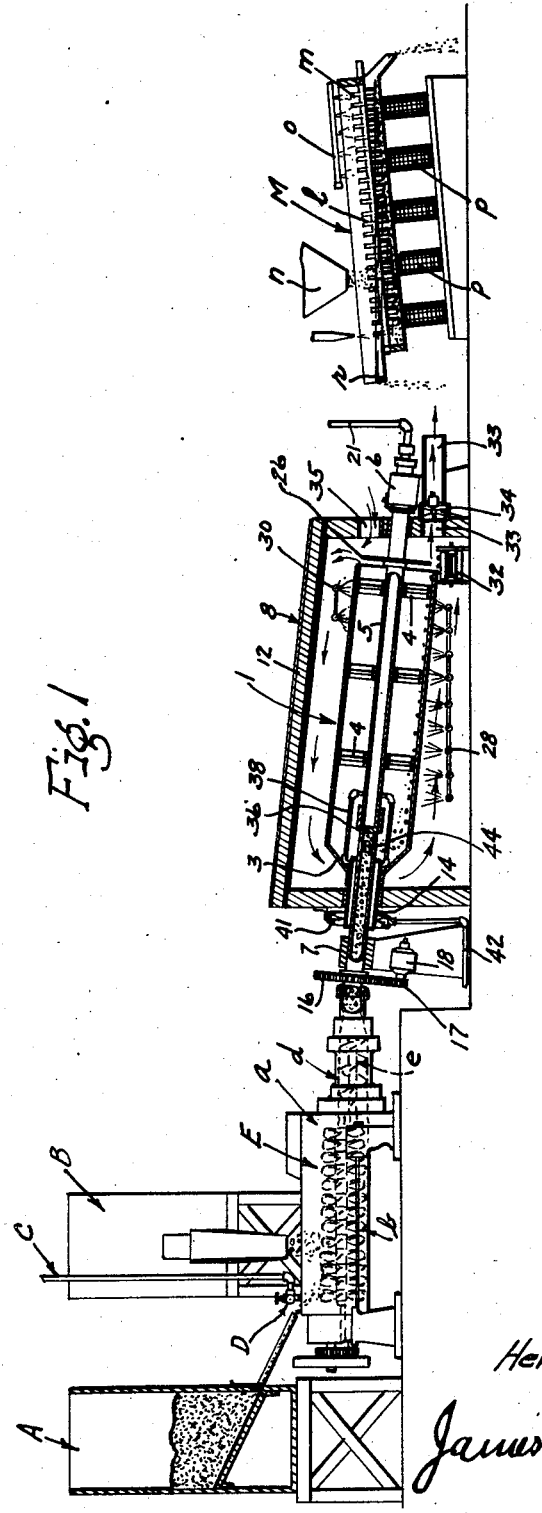
INVENTOR
Henry H. Hindshaw
BY HIS ATTORNEY
James F. Williamson

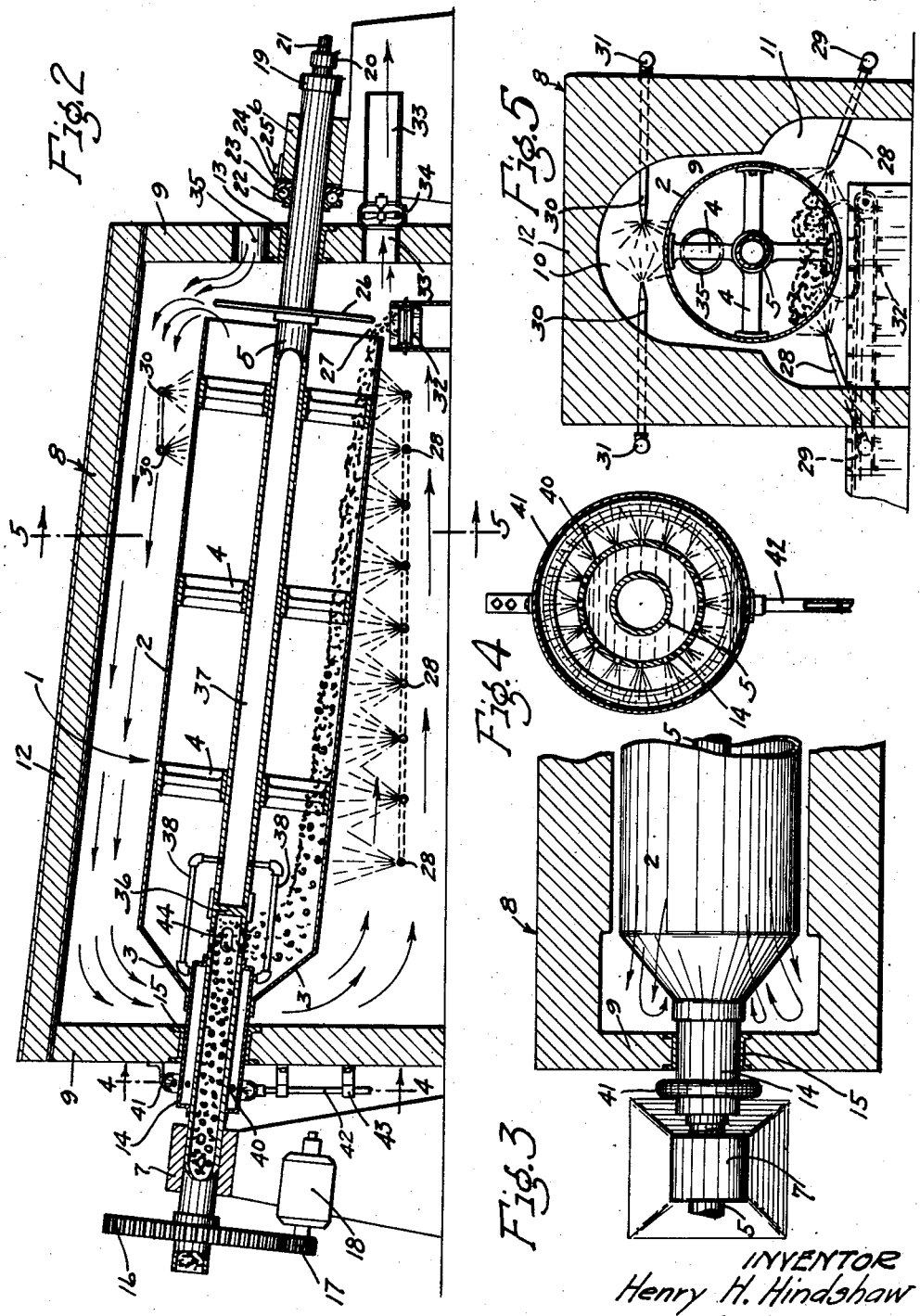

Patented June 15, 1926.

1,588,420

UNITED STATES PATENT OFFICE.

HENRY H. HINDSHAW, OF MINNEAPOLIS, MINNESOTA, ASSIGNOR TO HINDSHAW ENGINEERING AND DEVELOPMENT COMPANY, OF MINNEAPOLIS, MINNESOTA, A CORPORATION OF MINNESOTA.

PROCESS FOR UTILIZING LOW-GRADE IRON-ORE MATERIAL.

Application filed December 12, 1924. Serial No. 755,592.

The present invention relates to a process for utilizing and rendering commercially valuable low grade ore material particularly ore material containing iron ore.

Commercial iron is now obtained by smelting in a blast furnace ores which comprise iron usually in the form of oxides or carbonates. These iron ores comprise the oxides magnetite ($Fe_3O_4$) hematite ($Fe_2O_3$) limonite ($Fe_2O_3+H_2O$) siderite ($FeCO_3$). These and other ores exist in great abundance always mixed, however, with other minerals, principally silica, alumina, sulphur and phosphorus, Under present conditions in the art, an ore to be suitable for blast furnace use contains not less than forty-five percent by weight of metallic iron and also have a low content of sulphur and phosphorus. Such ores, however, exist only in comparative limited amounts. On the other hand, immense quantities of ore material exist containing from 25% to 45% of iron. A few of these latter ore materials can be utilized by eliminating the impurities by such means as washing, jigging or magnetic concentration, but by far the greater portion is not now utilizable for obtaining iron commercially. According to the best authorities there are available in the United States about four billion tons of ore which can be commercially used while there are about two hundred seventy six billion tons of ore material containing from 36% to 50% of iron which is not now commercially utilizable.

Magnetic concentration is a cheap and efficient method of separating iron ore from its accompanying impurities and is commercially applied on a comparatively large scale to magnetic ores. Most of the iron ores, however, including hematite and limonite are not sufficiently magnetic to admit of the use of this method so that the relative amount of ore thus handled is insignificant.

It has long been known that hematite can be rendered somewhat magnetic by simple heating or calcination and that a considerable magnetization can be induced therein by treating the same with hot carbonaceous gases. Such processes, however, have proved too expensive, slow and too uncertain and variable in the results to be practicable in a commercial way and there are many published records of extensive tests resulting in failures.

The magnetic property in iron ore appears to be inherent in the oxide $Fe_3O_4$. The ferrous oxide FeO is non-magnetic. Intermediate oxides between $Fe_2O_3$ and the non-magnetic oxide FeO, appear to be solid solutions of $Fe_3O_4$ in $Fe_2O_3$. The magnetic property of such an ore is dependent upon the percentage of $Fe_3O_4$. Taking the magnetic property of metallic iron as 100%, that of hematite is approximately 1.32, magnetite 40.18 and FeO zero.

It is an object of this invention, therefore, to provide a method by means of which a non-magnetic ore, such as $Fe_2O_3$ may be reduced by suitable heat treatment and reduction to a magnetic ore containing $Fe_3O_4$, the treatment being stopped before the ore is further reduced to FeO, the temperature used being insufficient to produce metallic iron.

It is a further object of this invention to provide a method in which non-magnetic iron ores are converted to magnetic iron ores by contact with reducing gases and solid carbon maintained at a temperature of from 300 degrees C. to 600 degrees C.

It is also an object of this invention to provide a method for rendering magnetic non-magnetic iron ore which consists in mixing the crushed ore with a carbonaceous material and heating the mixture to a temperature of from 300 to 600 degrees C. with a dearth of air, the treatment being stopped before the non-magnetic oxide FeO is produced in any appreciable quantities.

These and other objects and advantages of the invention will be fully set forth in the following description.

This application is for all common subject matter a continuation of applicant's copending application S. N. 439,343, filed January 24, 1921.

In carrying out the method of this invention, the ore material is first crushed to a fine condition. While this condition may vary, under different circumstances the material, preferably, is crushed fine enough to pass a four mesh to the inch screen. After the ore material is so crushed it is thoroughly and intimately mixed with a carbonaceous material. While various carbonaceous materials may be used, it is preferred to use peat or lignite, which make very good materials for this purpose. However, coal, oil or other fuels may be used. The mixing of ore and carbonaceous material or fuel may be carried out in any suitable apparatus, preferably in an apparatus of the type known as the common pug mill. The material is mixed, as stated, at low or ordinary temperatures and is then heated with a dearth or absence of air, to a temperature between substantially 300 degrees C. and substantially 600 degrees C. The heating process is continued until the ore is sufficiently reduced to have a magnetic effect compared with iron of about 20, the magnetic effect of the iron being taken, as above stated, as 100. The heating process is stopped before the non-magnetic oxide FeO is formed in any appreciable quantities. The reduction of the ore to form the magnetic oxides is accomplished both by contact with the gases formed during the heating process and by contact with the heated carbon. The ore is then allowed to cool and is afterwards separated in any suitable form of magnetic separator.

While various forms of apparatus may be used to carry out the method, one form of apparatus which is suitable for carrying out the process will be illustrated. The reduction process is effected in the part of this apparatus comprising an especially designed kiln forming part of the present invention. Such apparatus is illustrated in the accompanying drawings in which like reference characters refer to the same parts throughout the different views, and in which, Fig. 1 is a somewhat diagrammatic view of apparatus used in the invention, the kiln being shown in section;

Fig. 2 is a central longitudinal section of the kiln used;

Fig. 3 is a partial view of the kiln, the surrounding casing being shown in section;

Fig. 4 is a section taken on the line 4—4 of Fig. 2 looking in the direction of the arrows;

Fig. 5 is a section taken on the line 5—5 of Fig. 2, looking in the direction of the arrows.

Referring to the drawings, and particularly to Fig. 1, a bin A adapted to contain the crushed ore is shown mounted upon a suitable framework. Mounted upon a similar framework is shown a fuel bin B adapted to contain fuel material which has been broken up to a suitable degree. A pipe C carrying a faucet D is shown, which is adapted to be connected to a suitable water supply.

The crushed ore and fuel, and if desired, a suitable amount of water are fed into a mixer shown as E. The mixer illustrated is intended to represent any suitable standard or commercial form of mixer, such as a well known pug and auger mill. This mill is shown as comprising a longitudinal chamber $a$, oppositely rotating series of inclined blades $b$, a discharge spout $d$ in which revolves a screw conveyor $e$ adapted to convey and discharge the material out of spout $d$. From the mixer, the material is discharged into the kiln designated generally as 1. After the ore is passed therethrough, it is run through a magnetic separator. In Fig. 1 is more or less diagrammatically shown a common commercial form of separator M comprising a trough $m$, a bin or hopper $n$ arranged to discharge material thereinto, a pipe $o$ arranged to discharge water into the trough $m$ a series of magnets $p$, and a paddle conveyor $l$ for conveying the ore to the discharge spout $q$. In this separator, the gangue is shown as being washed out at the lower end $r$ of the trough. It will, of course, be understood that any desirable or efficient form of magnetic separator may be used.

Referring now to Figs. 2 to 5, the kiln designated as 1 is seen to comprise a long open-ended cylinder 2 having at one end, converging walls 3. This cylinder is supported by means of spiders 4 upon a hollow shaft 5 extending centrally therethrough, and which shaft is journaled for rotation near its opposite end in bearing structures or supports 6 and 7. The cylinder 2 is shown as surrounded by a casing 8, a cross section of which is shown in Fig. 5. This casing will be composed of suitable heat insulating and refractory material, such as fire brick, etc. The casing 8 comprises end walls 9 and the interior thereof is formed with an upper arch portion 10 and an enlarged lower portion 11. The cylinder 2 and shaft 5 are disposed in the kiln in an inclined position, the open end of the cylinder being the lower end, and the top wall 12 of the casing being substantially parallel to the top of the inclined cylinder 2. The shaft 5 passes through the end walls of chamber 8 and at its lower end, is arranged to pass through a bushing 13 set into the wall of the chamber. A cylindrical casing 14 is mounted on shaft 5 at its upper end for a purpose to be hereinafter described, and this cylinder is mounted in a bushing 15, also set into the end wall 9 of the casing. The shaft 5 projects beyond the bearing 7 at its upper end and has mounted thereon in rigid relation therewith, a gear 16. This gear is arranged to mesh and be driven by a pinion 17 which is shown as directly connected to some suitable motor 18 mounted on the side of bearing support 7. At its lower end, the shaft extends beyond the bearing 6 and is provided with a cap 19 formed with a reduction member 20 thereon into which is connected a pipe 21. Inside of bearing 6, the shaft 5 carries a thrust collar 22 firmly fastened thereto by any suitable means. This collar is arranged to bear upon ball bearings 23 carried between the collar 22 and a longitudinally adjustable collar 24 shown as mounted upon bearing 6 by the adjusting bolts 25. This bearing provides means for varying the longitudinal position of the cylinder 2 in the casing 8.

The lower end of cylinder 2 is partially closed by a circular plate 26 firmly secured upon shaft 5. An annular opening 27 is thus formed at the lower end of the cylinder.

Means are provided for applying heat to the cylinder 2, and such means comprises a series of pipes or nozzles 28 projecting through the walls of casing 8 into the lower chamber 11. These nozzles connect with suitable fuel supply pipes 29. At the upper part of chamber 10 in the kiln are also shown at each side thereof a pair of nozzles 30 which also extend through the walls of the casing and are connected to suitable supply pipes 31.

Material treated in the bin is adapted to be discharged at the lower end thereof through the opening 27, and beneath this opening is arranged an endless conveyor 32 suitably supported and operated by any suitable means to carry the material discharged to the outside of casing 8. In the lower part of the wall 9 at the discharge end of the casing, a discharge conduit 33 is set into the said wall and is provided with a fan 34 arranged to be operated in any suitable manner to create a current through said conduit, as indicated by the arrows in Fig. 2. Above the shaft 5 in the end wall 9 at the discharge end of the casing, an air inlet conduit 35 is set in the said wall.

It will be noted that the shaft 5 has, near the upper end of cylinder 2 a partition 36 formed therein, by means of which the lower part of the shaft is formed with the chamber 37. As previously mentioned, a cylindrical casing 14 is mounted on the upper end of the shaft and this casing extends into the casing 8 and forms the end closure for the converging walls 3 of cylinder 2. A plurality of pipes 38 are arranged to afford communication between the interior of casing 14 and chamber 37 of the shaft 5. Near the upper end of casing 14, the same has formed therethrough a series of perforations 40, and surrounding the casing at this point is an annular member 41 semi-cylindrical in cross section, as shown in Fig. 2, and a pipe 42 is connected at the lower portion of the member 41. The member 41 and pipe 42 are suitably supported upon the end wall of the casing by brackets 43.

The upper end of shaft 5 beyond the partition 36 constitutes the entrance chamber for the material to be treated in the kiln and openings 44 are formed through the walls of the pipe to form discharge outlets for the material. The operation of the apparatus is as follows:

The kiln and pipe 5 will be rotated by the motor 18 through the gears 16 and 17. The material to be treated will be introduced into the upper end of pipe 5 and be discharged into the kiln through the openings 44. This material, as previously indicated, consists of the ground and intimately mixed ore and fuel material. The fuel nozzles 28 will direct their flames upon the rotating cylinder 2. It will be understood that any desired type of burner may be used for heating the member 2, which burners can be made to be operated with air under pressure or with any other means capable of producing a high temperature. By means of the burners, the material in the kiln is thus heated to a temperature not exceeding substantially 600 degrees C. Hydrocarbon and other gases will be generated from the heated material and the pressure of these gases in the cylinder 2 will rise above the pressure outside of the cylinder, and the entrance of air thereinto is thus prevented.

The gases generated in the cylinder 2 will pass out of same at the top of opening 27, as indicated by the arrows in Fig. 2. These gases will be mixed with air which is drawn into the casing chamber through the conduit 35 and the mixture of gases and air will be ignited by the fuel nozzles 30. This burning mixture will be drawn around the cylinder 2, and the kiln will thus be practically surrounded by flames, as shown by the arrows in Fig. 2. The burned gases will be drawn out of conduit 33 by the suction fan 34. The hot carbon and carbonaceous material mixed with the ore will be so heated that it will readily oxidize and extract the necessary oxygen for this purpose from the ore material with which it is intimately mixed and in contact. The ore is thus reduced and rendered magnetic.

The reduced ore is discharged at the lower portion of the opening 27 and falls on the conveyor 32 by which it is conveyed outside of the casing chamber and is then ready to be operated upon by the magnetic separator.

In order to maintain the pipe 5 at a reasonably low temperature, water is circulated therethrough. Water is introduced into pipe 21 by a pump or other suitable means and is forced up through the pipe into chamber 37 and passes therefrom, through the pipes 38 into the interior of drum 14. From drum 14, the water is sprayed out through the perforations 40 and is collected by member 41 and conveyed away to any desired point by means of pipe 42. This water will be considerably heated and can be used as feed water for boilers, or for any other convenient or desired purpose.

The reduced ore, when coming from the kiln, is ready to be treated in the magnetic separator. As previously stated, any efficient and commercial form of magnetic separator can be used. The ore and gangue are still mixed together but the ore has been rendered magnetic so that it can now be easily and cheaply separated from the gangue. Before the treatment in the kiln, it was impossible to separate the ore and gangue profitably by any known process or means. The separated ore is now high in percentage of iron and forms a valuable and high grade product for blast furnace use.

Where it is found that the grain of the ore material requires further reduction in size, that is to say, where the component particles of the rock and ore are too large to admit of concentration to a high enough grade at the size at which it has been treated it can successively be ground finer, graded and then suitably treated in selected sizes and the gangue or rejected part from the first magnetic separations can also be reground and then again magnetically separated so that practically all of the ore is recovered or made available.

While the invention has been described as particularly directed to the treatment of iron ore, it will be understood that ores of other metals capable of similar reduction and magnetization may be treated by this process with beneficial effects, especially ores that carry as an impurity, some compound of iron, such as bauxite and certain zinc ores in which iron constitutes a deleterious impurity removable by means of the present invention.

From the above description it will be seen that applicant has invented a simple and efficient method by means of which immense quantites of iron ore material which is not now capable of being utilized in a commercial way, may be rendered available for commercial use. A very high grade product is obtained from this ore material which is not now commercially utilizable. The reduction of the material, as stated, is effected both by the contact of gas produced in the kiln and by contact with the carbon of the fuel which is heated red hot. It should be noted that the temperatures used are not sufficient to smelt the ore or to produce metallic iron and it is not desired to produce metallic iron. As also above stated, the heating process is not continued sufficiently to produce the non-magnetic oxide FeO in any appreciable quantities. The time necessary for the heating process will necessarily vary with different ore materials and fuels used. With one specific ore material, however, having a content of hematite of approximately 35% and using well ripened peat as a fuel the heating process would take approximately twenty minutes in the process carried out in the apparatus illustrated. This includes the time necessary to bring the material up to the required temperature. Once the material is brought to the desired temperature the reduction takes place in a very short time.

One of the advantages of applicant's process is that great quantities of iron material of low grade occur near the surface and are subject to cheap method of quarrying and handling. By applicant's process, these easily obtainable ore materials may be converted into a higher grade ore than that which is at present mined from great depths underground. A high grade iron ore can thus be obtained at less cost than are ores of lower grade at present. The ore, after being magnetically separated, is very rich in iron and there will thus be less impurities to be handled in the blast furnace which will result in increasing the capacity of the furnace. Furthermore, ores can be used which are in more convenient proximity to the present blast furnaces and a saving in freight charges.

It will, of course, be understood, that various changes may be made in the steps and sequence of steps in the process without departing from the scope of applicant's invention, which, generally stated, consists in a method capable of carrying out the objects above set forth and in the novel steps and combinations of steps disclosed and defined in the appended claims.

What is claimed is:

1. The process of rendering magnetic the non-magnetic compounds of iron in an ore material which consists in mixing said ore material in a crushed state with a substantially solid carbonaceous material and heating said mixture to a temperature between substantially 300 and 600 degrees C. with a dearth of air whereby the iron ore in said material is converted into magnetic oxide by contact with the heated carbonaceous material and such reduced gases only as are generated by said contact.

2. The process of rendering usable low grade non-magnetic iron ore material containing $Fe_2O_3$ which consists in reducing said $Fe_2O_3$ to $Fe_3O_4$, by mixing the crushed ore material with a substantially solid carbonaceous material and heating the mixture to a temperature not exceeding substantially 600 degrees C. until a sufficient amount of $Fe_3O_4$ is formed to render the ore strongly magnetic, and stopping the heating operation before the ore is converted in any appreciable quantity, to the non-magnetic oxide FeO, whereby said magnetic ore is rendered magnetic by direct contact with said carbonaceous material and such reducing gases only as are formed by said heating and contact.

3. The process of rendering usable low grade ore material containing $Fe_2O_3$ which consists in mixing the crushed material with a divided carbonaceous material at ordinary temperatures and then heating said mixture to a temperature between substantially 300° C. to 600° C. to reduce a substantial part of the $Fe_2O_3$ to $Fe_3O_4$ by the direct contact of said heated carbonaceous material with said ore material and only such reducing gases as are formed in such contact to render the ore magnetic and stopping the operation before the reduction is carried to the FeO stage.

4. The process of treating ore material containing a non-magnetic oxide of iron which consists in mixing a quantity of said material in a fine state with a quantity of peat to form an intimate mixture of the two, then heating said mixture with a dearth of air to a temperature of 300 degrees C. to 600 degrees C. to form a magnetic oxide in said ore by direct contact with said heated peat and the reducing gases formed by said heating and contact.

5. The process of rendering usable low grade ore material containing hematite which consists in mixing a quantity of said material in a finely divided state with a quantity of carbonaceous material, conveying said mixture through a chamber from which air is substantially excluded, heating said material to a temperature not exceeding substantially 600 degrees C. whereby said hematite is largely reduced to magnetite by contact with said heated carbonaceous material and the reducing gases formed without supplying any additional reducing gases to said chamber whereby said magnetite can be magnetically separated.

6. The process of rendering magnetic the iron compound impurities of certain ore materials which consists in crushing said materials, mixing said crushed material at ordinary temperatures with a carbonaceous material, heating said material to a temperature of from 300 degrees C. to 600 degrees C. to render magnetic said iron compounds by contact of said heated carbonaceous material therewith and by contact of such reducing gases as are formed by said first mentioned contact, cooling said mixture and magnetically separating said iron compounds from the material.

7. The process of rendering magnetic a non-magnetic compound of iron in an ore material which consists in mixing the crushed ore material at ordinary temperatures with a solid or semi-solid carbonaceous material, heating said mixture to a temperature between 300 and 600 degrees centigrade in a chamber with a dearth of air whereby the iron ore in said material is converted into a magnetic oxide entirely by contact with said heated carbonaceous material and by such reducing gases as are generated by said heating without supplying additional reducing gases to said chamber, cooling said heated material and then separating the iron ore magnetically.

8. The process of rendering magnetic the non-magnetic oxide iron ores containing the higher oxides of iron which consists in mixing said ore material in the crushed state with a divided carbonaceous material and heating said mixture to a temperature between substantially 300 to 600 degrees C. with a dearth of air whereby the higher oxides are reduced to lower magnetic oxides entirely by direct contact of said heated carbonaceous material and only by such reducing gases as may be generated by said direct contact, cooling the mixture and then separating the magnetic ore in a magnetic separator.

9. The process of rendering magnetic a non-magnetic compound of iron and an ore material which consists in mixing the crushed ore material at ordinary temperatures with a divided carbonaceous material, heating said mixture to a temperature between 200 and 300 degrees C. in a chamber with a dearth of air to reduce said compound of iron to a magnetic state by reducing gases generated by the direct contact of said ore material and heated carbonaceous material and also by the direct contact of said compound with said heated carbonaceous material without supplying any additional reducing gases to said chamber.

In testimony whereof I affix my signature.

HENRY H. HINDSHAW.